United States Patent [19]

Hiyama et al.

[11] Patent Number: 5,677,403
[45] Date of Patent: Oct. 14, 1997

[54] PROCESS OF PRODUCING VINYL CHLORIDE POLYMER WITH MERCAPTO TERMINATED POLYVINYLALCOHOL

[75] Inventors: Tadayoshi Hiyama; Tadashi Amano, both of Kamisu-machi, Japan

[73] Assignee: Shin-Etsu Chemical Co., Ltd., Tokyo, Japan

[21] Appl. No.: 548,679

[22] Filed: Oct. 26, 1995

[30] Foreign Application Priority Data

Oct. 27, 1994 [JP] Japan ................................. 6-287507

[51] Int. Cl.$^6$ ........................................................ C08F 2/20
[52] U.S. Cl. ........................................ 526/200; 526/202
[58] Field of Search ..................................... 526/200, 202

[56] References Cited

U.S. PATENT DOCUMENTS 5,349,008  9/1994  Takada ..................................... 526/201

Primary Examiner—Christopher Henderson
Attorney, Agent, or Firm—Oblon, Spivak, McClelland, Maier & Neustadt, P.C.

[57] ABSTRACT

This process uses, as dispersion stabilizers, (A) a partially saponified polyvinyl alcohol having an average polymerization degree of 300 to 2,000, a saponification degree of 70 to 85 mol %, and a mercapto group at least one terminal ends of its molecule chain, and (B) a hydroxypropylmethyl cellulose having a methoxy substitution of 26 to 30% by weight, a hydroxypropoxy substitution of 4 to 15% by weight, and a viscosity of 5 to 4,000 cP at 20° C. in the state of a 2 weight % aqueous solution, in subjecting a vinyl monomer comprised mainly of vinyl chloride to suspension polymerization in an aqueous medium. A polymer which is high in porosity and will provide a molded item having few fish eyes can be produced in high productivity. Furthermore, since deposition of polymer scale on the inner wall of a polymerization vessel is little, removing the scale is easy and the polymerization vessel can be efficiently used.

8 Claims, No Drawings

PROCESS OF PRODUCING VINYL CHLORIDE POLYMER WITH MERCAPTO TERMINATED POLYVINYLALCOHOL

BACKGROUND OF THE INVENTION

1. Field of the Invention

The present invention relates to a process of producing a vinyl chloride polymer, and particularly to a process of producing a vinyl chloride polymer which has a particle structure high in porosity, will form few fish eyes and is high in plasticizer take-up, in high productivity while keeping deposition of polymer scale after polymerization at a low level.

2. Description of the Prior Art

Conventionally, there have been proposed many processes of producing a vinyl chloride polymer high in porosity and excellent in processability. For example, Japanese Pre-examination Patent Publication (kokai) Nos. 52-5886 (1977), 52-15890 (1977), 55-112210 (1980), and 53-6392 (1978) and Japanese Patent Publication (kokoku) No. 61-18562 (1986) disclose processes of producing a vinyl chloride polymer by using, as a dispersant, a so-called oil-soluble polyvinyl alcohol having a saponification degree of 55 mol % or less and an average polymerization degree of 600 or less in order to increase the porosity to thereby decrease the formation of fish eyes and improve the plasticizer take-up.

Although, according to these processes, the obtained polymer is surely high in porosity to a certain extent, a slurry at the last stage of polymerization increases in apparent viscosity to decrease in flowability. As a result, heat of polymerization reaction generated in the reaction mixture can not be sufficiently dissipated, so that the quality of the polymer is adversely affected in terms of the plasticizer take-up and the formation of fish eyes when molded. For this reason, the above processes are still unsatisfactory with respect to improvement in the formation of fish eyes and the plasticizer take-up. Furthermore, these processes have the problems that the particle size of the obtained polymer is too fine, that the particle size distribution of the polymer is broad, and that polymer scale is deposited on the inner wall of a polymerization vessel.

SUMMARY OF THE INVENTION

Accordingly, an object of the present invention is to provide a process capable of producing a vinyl chloride polymer which is narrow in particle size distribution, will form few fish eyes, and is high in plasticizer take-up, in high productivity and stably while removing the above defects.

The inventors of the present invention have earnestly studied and, as a result, found that the above object is accomplished by using a specific dispersion stabilizer when subjecting vinyl chloride or a mixture of vinyl monomers comprising vinyl chloride to suspension polymerization in an aqueous medium.

Thus, the present invention provides, as a means for accomplishing the above object, a process of producing a vinyl chloride polymer, comprising subjecting vinyl chloride or a mixture of vinyl monomers comprising vinyl chloride to suspension polymerization in an aqueous medium in the presence of a dispersion stabilizer, wherein said dispersion stabilizer comprises:

(A) a partially saponified polyvinyl alcohol having an average polymerization degree of 300 to 2,000, and a saponification degree of 70 to 85 mol %, and having a mercapto group at least one terminal end of its molecule chain; and (B) a hydroxypropylmethyl cellulose having a methoxy substitution of 26 to 30% by weight, a hydroxypropoxy substitution of 4 to 15% by weight, and a viscosity of 5 to 4,000 cP at 20° C. in the state of a 2 weight % aqueous solution.

According to the production process of the present invention, a polymer which is high in porosity and will provide a molded item having few fish eyes can be produced in high productivity. Furthermore, since deposition of polymer scale on the inner wall of a polymerization vessel is little, removing the scale is easy and the polymerization vessel can be efficiently used.

DETAILED DESCRIPTION OF THE PREFERRED EMBODIMENTS

The present invention is hereinafter described in more detail.

Dispersion Stabilizer (A)

The dispersion stabilizer (A) [hereinafter referred to as "dispersant (A)"] is a partially saponified polyvinyl alcohol having an average polymerization degree of 300 to 2,000, preferably 500 to 1,500; a saponification degree of 70 to 85 mol %, preferably 75 to 85 mol %; and a mercapto group at least one terminal end of its molecule chain. If the average polymerization degree is less than 300 or the saponification degree is less than 70 mol %, the particle size of the resulting vinyl chloride polymer is too fine, the particle size distribution of the polymer is broad, and also deposition of polymer scale during polymerization is likely to increase. If the average polymerization degree is more than 2,000 or the saponification degree is more than 85 mol %, the porosity of the resulting polymer decreases and fish eyes in a molded item obtained by molding the polymer is likely to increase.

The partially saponified polyvinyl alcohols as mentioned above include those represented by the general formula:

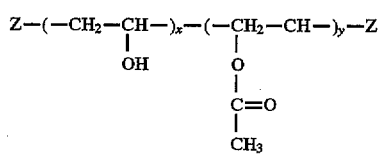

wherein Z, which may be the same or different, is a mercapto group or a hydrogen atom, provided that at least one Z is a mercapto group, and x and y are each a positive integer.

(B) Hydroxypropylmethyl Cellulose

The hydroxypropylmethyl cellulose [hereinafter referred to as "dispersant (B)"] should have a methoxy substitution of 26 to 30% by weight, preferably 27 to 29% by weight; a hydroxypropoxy substitution of 4 to 15% by weight, preferably 7 to 10% by weight; and a viscosity of 5 to 4,000 cP, preferably 20 to 100 cP, at 20° C. in the state of a 2 weight % aqueous solution. If the methoxy substitution of the dispersant (B) is less than 26% by weight or the hydroxypropoxy substitution is less than 4% by weight, a polymer low in porosity is obtained. If the methoxy substitution is more than 30% by weight or the hydroxypropoxy substitution is more than 15% by weight, the particle size distribution of the resulting polymer becomes broad.

The ratio (A)/(B) of the dispersant (A) to the dispersant (B) to be charged is in the range of preferably 95/5 to 1/1 by weight, more preferably 9/1 to 1/1 by weight. The total amount of the dispersion stabilizers (A) and (B) to be charged is in the range of preferably 0.02 to 0.5 part by weight, more preferably 0.03 to 0.1 part by weight, per 100 parts by weight of the monomer or the monomer mixture.

Other Polymerization Condition

The other polymerization conditions of the present production process may be similar to those having conventionally been used in suspension polymerization of vinyl chloride or a mixture of vinyl monomers comprising vinyl chloride as a primary component in an aqueous medium.

Monomer

As the monomer, there can be used vinyl chloride alone and otherwise a mixture of monomers comprising vinyl chloride, as a primary component, and a vinyl monomer copolymerizable with vinyl chloride. The amount of the vinyl chloride contained in the mixture is usually 50% by weight or more. The vinyl monomers copolymerizable with vinyl chloride include vinyl esters such as vinyl acetate and vinyl propionate; (metha)acrylic acid and its esters, such as acrylic acid, methacrylic acid, methyl acrylate, ethyl acrylate, methyl methacrylate and ethyl methacrylate; olefins such as ethylene and propylene; maleic anhydride; acrylonitrile; styrene; α-methyl styrene; and vinylidene chloride.

Polymerization Initiator

The polymerization initiators include, for example, peresters such as t-butyl peroxyneodecanoate, t-butyl peroxypivalate, t-hexyl peroxy pivalate, α-cumyl peroxyneodecanoate, t-hexyl neohexanoate and 2,4,4-trimethylpentyl-2-peroxy-2-neodecanoate; percarbonates such as diisopropyl peroxydicarbonate, di-2-ethylhexyl peroxydicarbonate, di-2-ethoxyethyl peroxydicarbonate and dimethoxyisopropyl peroxydicarbonate; peroxides such as decanoyl peroxide, lauroyl peroxide, benzoyl peroxide, cumene hydroperoxide, cyclohexanone peroxide, 2,4-dichlorobenzoyl peroxide, p-menthane hydroperoxide, 3,5,5-trimethylhexanoyl peroxide, isobutylyl peroxide and acetylcyclohexylsulfonyl peroxide; azo compounds such as α, α'-azobisisobutylonitrile, α, α'-azobis(2,4-dimethylvaleronitrile) and α, α'-azobis(4-methoxy-2,4-dimethylvaleronitrile); persulfates such as potassium persulfate and ammonium persulfate; and hydrogen peroxide, which may be used singly or in a combination of two or more thereof.

The amount of the polymerization initiator is in the range of preferably 0.01 to 0.5 part by weight, more preferably 0.03 to 0.2 part by weight, per 100 parts by weight of the monomer.

Aqueous Medium

The aqueous medium includes city water or the like, which is used in the range of generally 90 to 200 parts by weight, preferably 90 to 130 parts by weight, per 100 parts by weight of the monomer. Additional water may be supplied optionally during polymerization.

Other Additives

The additives, which are optionally added as necessary, include, for example, a polymerization regulator, a chain transfer agent, a pH adjuster, a gelation improver, an antistatic agent and a scale preventive agent. A small amount of a surface active agent can be also added.

Polymerization

The method of charging the monomer, the aqueous medium, and other materials, as mentioned above; and other polymerization conditions such as polymerization temperature may be similar to those which are conventionally known. A typical embodiment is carried out as follows, for example.

First, the dispersants (A) and (B) and the aqueous medium are charged into a polymerization vessel. Then, after the inside of the polymerization vessel is evacuated to be in the state of reduced pressure, the monomer is charged into the vessel. Subsequently, the polymerization initiator is charged into the vessel to prepare an aqueous suspension. Elevation of the temperature is started under stirring, and polymerization is carried out at a reaction temperature of from 30° to 80° C. The aqueous medium, the dispersants, the polymerization initiator, and one or more of the other additives, as mentioned above, may be optionally added as required during the polymerization. After the completion of the polymerization reaction, the unreacted monomer is recovered and the resulting polymer in a slurry state is dehydrated and dried to obtain the desired polymer.

EXAMPLES

The embodiments of the present invention are hereinafter described by referring to working examples and comparative examples, to which examples the invention is not limited.

Examples 1 and 2 and Comparative Examples 1 to 4

In each of Examples and Comparative Examples, into a polymerization vessel consisting of an autoclave having an inner volume of 2 $m^3$, 900 kg of pure water and the dispersants (A) and (B) shown in Table 1 were charged under the conditions given in Table 1. Then, the inside of the autoclave was evacuated by a vacuum pump until the inner pressure reached −700 mmHg. Thereafter, 700 kg of the vinyl chloride monomer and then, as a polymerization initiator, 420 g of t-butyl peroxyneodecanoate were charged into the autoclave, followed by starting elevation of the temperature. Polymerization was continued while maintaining the inner temperature at 57.0° C. At the time when the inner pressure of the vessel reached 6.0 $kg/cm^2G$, the polymerization was stopped and the unreacted monomer was recovered. Thereafter, the resulting slurry was taken out of the vessel, dehydrated and dried to obtain a polymer.

TABLE 1

| | Example 1 | Example 2 | Comparative Example 1 | Comparative Example 2 | Comparative Example 3 | Comparative Example 4 |
|---|---|---|---|---|---|---|
| Dispersant (A) | polymerization degree: 600 saponification degree: 80.6 mol % SH-PVA[1] | polymerization degree: 1500 saponification degree: 78.6 mol % SH-PVA[1] | polymerization degree: 1400 saponification degree: 90.6 mol % SH-PVA[1] | polymerization degree: 600 saponification degree: 88.7 mol % SH-PVA[1] | polymerization degree: 2550 saponification degree: 80.0 mol % PVA | polymerization degree: 2550 saponification degree: 80.0 mol % PVA |

TABLE 1-continued

|  | Example 1 | Example 2 | Comparative Example 1 | Comparative Example 2 | Comparative Example 3 | Comparative Example 4 |
|---|---|---|---|---|---|---|
| Dispersant (B) | hydroxypropyl-methyl cellulose[2] | hydroxypropyl-methyl cellulose[2] | hydroxypropyl-methyl cellulose[2] | hydroxypropyl-methyl cellulose[2] | hydroxypropyl-methyl cellulose[2] | hydroxypropyl-methyl cellulose[2] |
| (A)/(B) (weight ratio) | 7/3 | 7/3 | 7/3 | 7/3 | 7/3 | 7/3 |
| Total amount of (A) and (B) (per 100 parts by weight of monomer) | 0.05 part by weight | 0.05 part by weight | 0.05 part by weight | 0.05 part by weight | 0.05 part by weight | 0.05 part by weight |
| Other dispersant (amount per 100 parts by weight of monomer) | — | — | — | — | — | polymerization degree: 250 saponification degree: 48 mol % PVA (0.05 part by weight |

Notes for Table 1:
1) SH-PVA: a partially saponified polyvinyl alcohol blocked by a mercapto group at one terminal end of the molecular chain.
2) a hydroxypropylmethyl cellulose having a methoxy substitution of 29% by weight, a hydroxypropoxy substitution of 10% by weight, and a viscosity of 50 cP at 20° C. in the state of a 2 weight % aqueous solution.
In each of Examples and Comparative Examples, with respect to the thus obtained polymer, a bulk specific gravity, a particle size distribution, a plasticizer take-up, fish eyes, and the state of scale deposition in the polymerization vessel were measured in the following manner. The results are shown in Table 2.

Bulk specific gravity:
This was measured in accordance with JIS K-6721.

Particle size distribution:
This was measured in accordance with JIS Z-8801.

Plasticizer take-up:
The bottom of an aluminum alloy container having an inner diameter of 25 mm and a depth of 85 mm was filled with glass fiber and then a 10 g sample taken from the polymer was charged therein. After 15 cc of DOP (dioctyl phthalate) was added thereto, the polymer sample was allowed to stand for 30 minutes in order to sufficiently permeate DOP into the polymer. Then, excess DOP was centrifuged under an acceleration of 1,500 G, and the amount of DOP absorbed in the polymer sample was measured and converted to the amount per 100 g of the polymer.

Fish eyes:
25 g of a compound consisting of 100 parts by weight of a sample polymer, 1 part by weight of tribasic lead sulfate, 1.5 parts by weight of lead stearate, 0.2 part of titanium dioxide, 0.1 part by weight of carbon black, and 50 parts by weight of DOP was kneaded by means of a roll mill having a temperature of 145° C. for 3 minutes and formed into a sheet having a thickness of 0.2 mm. Then, the number of transparent particles in 100 $cm^2$ of the sheet was counted.

TABLE 2

|  | Example 1 | Example 2 | Comparative Example 1 | Comparative Example 2 | Comparative Example 3 | Comparative Example 4 |
|---|---|---|---|---|---|---|
| Bulk specific gravity (g/mL) | 0.535 | 0.525 | 0.510 | 0.515 | 0.520 | 0.498 |
| Particle undersize distribution (pass weight %) |  |  |  |  |  |  |
| #60 | 100 | 100 | 100 | 100 | 100 | 99.5 |
| #100 | 55.1 | 62.1 | 73.5 | 68.3 | 41.2 | 78.5 |
| #200 | 0.1 | 0.1 | 1.2 | 0.9 | 0.7 | 3.4 |
| Plasticizer take-up | 30.5 | 29.0 | 20.1 | 22.3 | 24.3 | 27.0 |
| fish eye (number/100 $cm^2$) | 1 | 1 | 100 | 50 | 1500 | 10 |
| State of polymer scale deposition | good | good | good | good | good | poor |

Note for Table 2:
Good:
Slight deposition of polymer scale was observed at and in the vicinity of the gas phase/liquid phase interface of the inner wall surface of the vessel, but no deposition at the liquid phase portion of the same surface.
Poor:
A great deal of deposition of polymer scale was observed at and in the vicinity of the gas phase/liquid phase interface; polymer scale was also deposited at a part of the liquid phase portion; and at the end of the polymerization, heat dissipation became insufficient so that the inner temperature rose by 2° C. relative to a desired inner temperature.

What is claimed is:

1. A process of producing a vinyl chloride polymer, comprising subjecting vinyl chloride or a mixture of vinyl monomers comprising vinyl chloride to suspension polymerization in an aqueous medium in the presence of a dispersion stabilizer, wherein said dispersion stabilizer comprises:

(A) a partially saponified polyvinyl alcohol having an average polymerization degree of 300 to 2,000 and a saponification degree of 70 to 85 mol %, and having a mercapto group at one terminal end of its molecule chain, and a mercapto group or a hydrogen atom at another terminal end of its molecule chain; and (B) a hydroxypropylmethyl cellulose having a methoxy substitution of 26 to 30% by weight, a hydroxypropoxy substitution of 4 to 15% by weight, and a viscosity of 5 to 4,000 cP at 20° C. in the state of a 2 weight % aqueous solution.

2. A process according to claim 1, wherein the dispersion stabilizer (A) has an average polymerization degree of 500 to 1,500 and a saponification degree of 75 to 85 mol %.

3. A process according to claim 1, wherein the dispersion stabilizer (A) is a compound represented by the general formula:

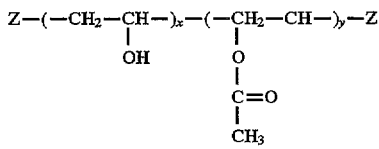

wherein Z, which may be the same or different, is a mercapto group or a hydrogen atom, provided that at least one Z is a mercapto group, and x and y are each a positive integer.

4. A process according to claim 1, wherein the dispersion stabilizer (B) has a methoxy substitution of 27 to 29% by weight, a hydroxypropoxy substitution of 7 to 10% by weight, and a viscosity of 20 to 100 cP in said state.

5. A process according to claim 1, wherein the ratio (A)/(B) of the dispersion stabilizer (A) to the dispersion stabilizer (B) to be charged is in the range of 95/5 to 1/1 by weight.

6. A process according to claim 1, wherein the total amount of the dispersion stabilizers (A) and (B) to be charged is in the range of 0.02 to 0.5 part by weight per 100 parts by weight of the monomer or the monomer mixture.

7. A process according to claim 1, wherein the mixture of vinyl monomers comprises vinyl chloride and at least one comonomer selected from the group consisting of vinyl esters, acrylic acid and its esters, methacrylic acid and its esters, olefins, maleic anhydride, acrylonitrile, styrene, α-methyl styrene, and vinylidene chloride.

8. A process according to claim 1, wherein said partially saponified polyvinyl alcohol as an average polymerization degree of 600, a saponification degree of 80.6 mol % and a mercapto group at one end of its molecule chain; and said hydroxypropylmethyl cellulose has a methoxy substitution of 29% by weight, a hydroxypropoxy substitution of 10% by weight, and a viscosity of 50 cP at 20° C. in the state of a 2 weight % aqueous solution.

* * * * *